United States Patent [19]

Atkinson et al.

[11] Patent Number: 5,650,898
[45] Date of Patent: Jul. 22, 1997

[54] MAGNETIC DISK CARTRIDGE COMPRISING A NONWOVEN FABRIC LINER WITH INDENTATIONS FORMED THEREIN

[75] Inventors: John C. Atkinson, Andover, Mass.; Thomas A. Dindinger, Riner, Va.

[73] Assignee: Hollingsworth & Vose Company, East Walpole, Mass.

[21] Appl. No.: 456,475

[22] Filed: Jun. 1, 1995

Related U.S. Application Data

[62] Division of Ser. No. 26,438, Apr. 20, 1993, Pat. No. 5,455,109.

[51] Int. Cl.$^6$ .................. G11B 23/033; B32B 5/14; B32B 27/14; D04H 1/04
[52] U.S. Cl. .................. 360/133; 428/171
[58] Field of Search .................. 360/133; 428/900, 428/695, 284, 171, 288, 280, 290

[56] References Cited

U.S. PATENT DOCUMENTS

| | | | |
|---|---|---|---|
| 4,223,361 | 9/1980 | Zaitsu et al. | 360/133 |
| 4,251,843 | 2/1981 | Masuyama et al. | 360/133 |
| 4,405,325 | 9/1983 | Antlfinger et al. | 428/287 |
| 4,414,597 | 11/1983 | Cornin | 360/133 |
| 4,586,606 | 5/1986 | Howey | 428/287 |
| 4,610,352 | 9/1986 | Howey et al. | 428/287 |
| 4,639,390 | 1/1987 | Shoji | 428/195 |
| 4,655,348 | 4/1987 | Takagi | 360/133 |
| 4,709,816 | 12/1987 | Matsumoto et al. | 360/133 |
| 4,812,938 | 3/1989 | Rogers et al. | 360/133 |
| 4,845,583 | 7/1989 | Zimmerman et al. | 360/133 |
| 4,897,752 | 1/1990 | Doi et al. | 360/133 |
| 4,977,475 | 12/1990 | Shiba et al. | 360/133 |
| 4,998,176 | 3/1991 | Takemae et al. | 360/133 |
| 5,060,105 | 10/1991 | Howey | 360/133 |
| 5,122,919 | 6/1992 | Takemae et al. | 360/133 |
| 5,179,487 | 1/1993 | Niitsuma et al. | 360/133 |
| 5,317,467 | 5/1994 | Kato et al. | 360/133 |

*Primary Examiner*—Craig A. Renner
*Attorney, Agent, or Firm*—William C. Geary, III; Nutter, McClennen & Fish, LLP

[57] ABSTRACT

A floppy disk liner is formed of one or more latex bonded non-woven fibers. The fibers forming the liner may be formed from a cellulosic material, a thermoplastic material, or a combination of cellulosic and thermoplastic materials. At least one side of the liner has a plurality of indentations that do not entirely penetrate the liner. The indentations may occupy a total of not less than about 15% of the surface area of the liner.

6 Claims, 1 Drawing Sheet

MAGNETIC DISK CARTRIDGE COMPRISING A NONWOVEN FABRIC LINER WITH INDENTATIONS FORMED THEREIN

This is a divisional of application Ser. No. 08/026,438 filed on Apr. 20, 1993 now U.S. Pat. No. 5,455,109, issued on Oct. 3, 1995.

BACKGROUND OF THE INVENTION

The invention relates to a non-woven liner composition useful in the manufacture of flexible disk assemblies.

Magnetic media is used for storage of data and other information in computer readable form. Such media is usually in the form of a flexible or floppy disk and is housed within a disk jacket. Disk jackets are often lined with a fibrous material that is in contact with the disk. The fibrous material, or liner, is intended to protect the disk from damage and contamination from dust and other debris. The liner also serves to clean contaminants from the disk surface.

Dust and other contaminants can cause dropout errors in which information is either not read from or written to the disk, or is improperly read from or written to the disk. The jacket forms substantially closed environment for housing the disk. The jacket keeps most dust and debris particles from entering the interior of the jacket and contacting the disk. Nevertheless, some particles of dust or other debris may still find their way to the disk, and the liner acts to remove such particles. Moreover, the liner provides a low friction surface that contacts and protects the disk as it rotates within the jacket during use.

Most flexible disk liners are manufactured from a non-woven fabric, but there is considerable variety in the materials used to manufacture the liner, and in the liner construction. Rayon, polyester, and other polymeric fibers are commonly used for manufacturing non-woven liner materials.

The fibers that form the non-woven fabric can be bonded together in different ways to form the liner. One common bonding method is by heat bonding or thermobonding, where thermal energy is applied at various points to fuse individual fibers together, thus forming a liner. Another bonding technique is known as latex or chemical bonding where a polymer latex or emulsion is applied to a fiber web to form the liner. Combinations of thermobonding and latex bonding can also be used. U.S. Pat. Nos. 4,414,597; 4,586,606; and 4,655,348 disclose various disk liner materials formed through a thermal bonding technique. U.S. Pat. Nos. 4,998,176; 5,060,105; and 5,122,919 disclose various disk lining materials manufactured through a combination of chemical and thermal bonding.

Latex or chemical bonded liners are desirable in that they are less prone to fray and contribute debris to the magnetic media within a flexible disk assembly. One perceived drawback of such liners, at least from an aesthetic standpoint, is that they tend to be relatively stiff. Latex or chemical bonded liners also have a relatively high air porosity. As a result, they can be difficult to use with automated disk assembly lines in which the liner is transferred by vacuum or suction to a disk jacket. Due to the inherently high air permeability of such a liner, it can be difficult to pick up and transfer liners through the application of suction. It would thus be advantageous to maintain the desirable properties of latex or chemical bonded liners while improving their aesthetics and rendering them more amenable to use in automated disk assembly lines.

Accordingly, it is an object of the invention to provide a chemically bonded, non-woven disk liner having a reducer stiffness. Another object of the invention is to provide a chemically bonded, non-woven disk liner having a significantly reduced air permeability. It is also an object of the invention to provide a chemically bonded, non-woven disk liner that effectively cleans and protects magnetic media within a flexible disk assembly. Other objects of the invention will be apparent to those having ordinary skill in the art upon reading the following disclosure.

SUMMARY OF THE INVENTION

The invention comprises liner material for flexible or floppy disks that is formed from a chemically bonded, non-woven fabric. The liner of the present invention has stiffness and air permeability properties which are significantly reduced with respect to similar chemically bonded non-woven liner materials.

The liner preferably comprises a non-woven fabric formed of staple fibers bonded together with a latex material. The latex bonding material typically is present at about 10–35% by weight of the liner. At least one side of the liner has a plurality of spaced, permanent indentations, which do not completely penetrate the liner. The indentations preferably are present at a density such that the indentations comprise about 15% of the surface area of the liner, and more preferably between about 15 and 25% of the liner. Preferably at least one of the fibers from which the liner is made is a thermoplastic staple fiber. In one embodiment, the fiber material of the liner comprises approximately a 50—50 blend of polyethylene terephthalate and rayon.

The liner material of the invention preferably has an air permeability measured by American Society for Testing Materials (ASTM) standard D737-75 of not more than about 450 cubic feet per minute (cfm). A reduction of stiffness of greater than 40% is generally achieved with embossed liner materials as compared to non-embossed liner materials.

DETAILED DESCRIPTION OF THE INVENTION

Figure 1:
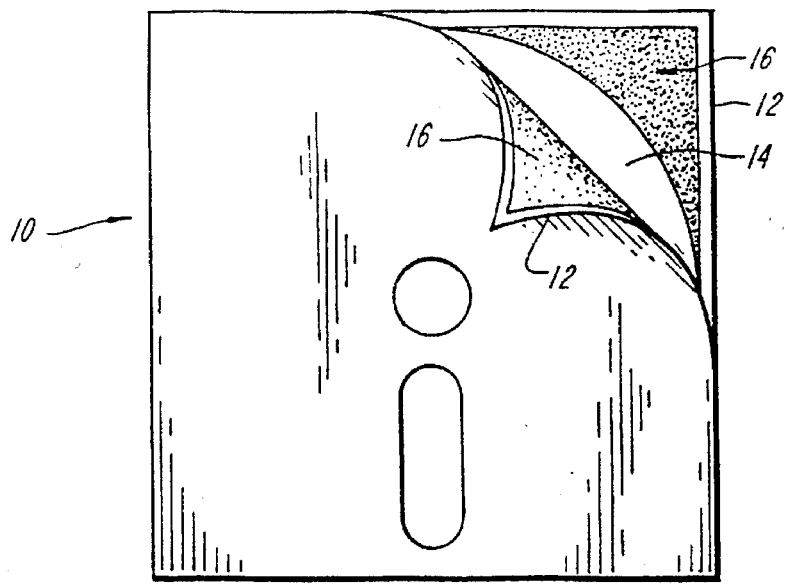
FIG. 1 illustrates the liner of the invention disclosed in a flexible disk assembly.

FIG. 1 illustrates a flexible disk assembly 10 of the type well known in the art. Assembly 10 includes a jacket 12 that protects and encloses a rotatable magnetic media disk 14. Liner 16 is mounted on the inside surfaces of the upper and lower jacket 12, adjacent each side of disk 14.

The liner 16 serves to protect the disk and also to clean any debris from the surface of the disk as it rotates within the jacket. Among the advantages of the liner of the present invention are the cleaning properties of the liner, and the reduced stiffness and air permeability of the liner.

Figure 2:
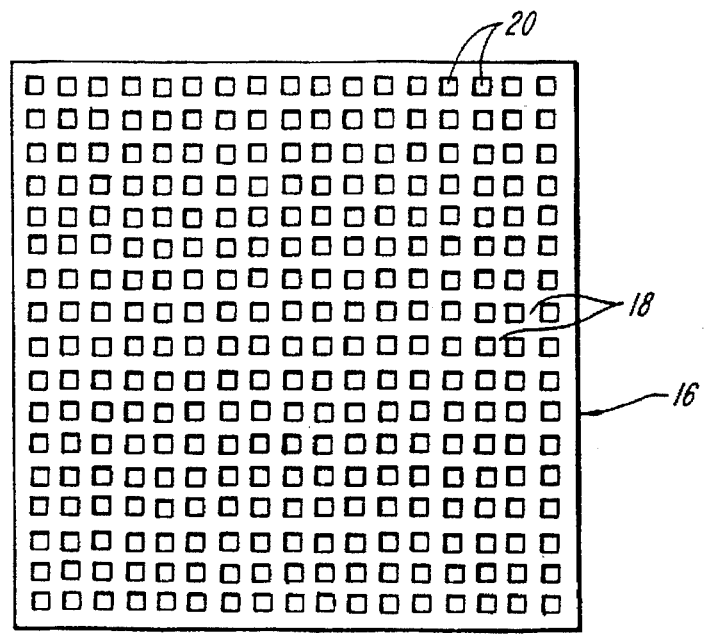
FIG. 2 is a top view of the liner material of the invention.
Figure 3:
FIG. 3 is a cross-sectional view of the liner material of the invention.

The liner 16 of the present invention is formed of a chemically bonded non-woven fabric which is formed by one or more types of non-staple fibers. The fibers may be thermoplastic, non-thermoplastic or a mixture of thermoplastic and non-thermoplastic fibers. As illustrated in FIGS. 2 and 3 one surface 18 of a liner 16, preferably the disk facing surface, features a plurality of indentations 20 that do not penetrate the liner. In a preferred embodiment, the indented portions of the liner comprise at least about 15% of the surface area of the liner, and more preferably about 15–25% of the surface area of the liner. The non-woven fabric web preferably is bonded with a latex material. Preferably, the latex bonding material comprises about 10–35% by weight of the liner.

Although the drawings illustrate what generally resembles a 5.25 inch flexible disk, it is understood that the liner materials of the present invention may also be used with disks of other dimensions, particularly 3.5 inch disks.

The fibers used to form the liner can be formed from non-thermoplastic materials including rayon, cotton, wool, and other cellulosic fibers. Thermoplastic fibers from which the liner can be manufactured include polyesters, nylons, and acrylics. As noted above, the fabric can be formed by fiber blends, including blends of both thermoplastic and non-thermoplastic fibers. A preferred fiber blend is an approximately 50—50 blend of rayon and polyethylene terephthalate.

As noted above, the binder can be a latex comprising styrene butadiene rubber, nitrile butadiene rubber, ethylene vinyl acetate, ethylene vinyl chloride, acrylic copolymers, polyvinyl acetate, polyvinyl alcohol, polyester, and elastomeric materials. The binder preferably comprises approximately 10–35 weight percent and more preferably about 12–17 weight percent of the liner. The binder formulation may also include various foaming agents, antistatic agents, pH controlling agents, and other processing aids known in the art.

A preferred binder material is styrene butadiene rubber, having about 46 percent styrene.

The liner can be manufactured by a variety of techniques well known in the art. Preferably the liner is manufactured in a dry-laid process by opening and blending the fibers, followed by carding the fibers. The latex bonding agent is then applied to the fiber web and the material is passed through a smooth calendering roll. The calendering roll applies a pressure of approximately 500 to 700 psi and is maintained at a temperature in the range of about 22° to 50° C. Thereafter, indentations are formed in the liner by passing the liner through an embossing roll having a predetermined pattern of indentations that are transferred to the liner. The working pressure of the embossing roll is preferably maintained in the range of about 50 to 100 KN/mm, but may vary depending upon the embossing equipment used. To avoid any melting of fiber or binder, the embossing roll should be maintained at a temperature substantially below the melting point of any thermoplastic material used to form the liner. For example, a rayon/polyethylene terephthalate fiber blend in which the melting point of polyethylene terephthalate is approximately 250° C. should have an embossing roll temperature of approximately 160° to 180° C. One skilled in the art will appreciate that embossing roll temperature can vary to control thickness variation, air permeability, and fabric stiffness.

The size of the liner applied to a flexible disk jacket is well known in the art will vary depending upon the size of the flexible disk assembly. The thickness of the liner material can also vary and to some extent is controlled by the calendering and embossing pressure. The thickness range of the liner is approximately 5 to 12 mils, as determined by test method ASTM standard D1777. Preferably, the liner thickness is substantially constant across the width of the liner.

The indentations formed in the liner of the present invention are believed to contribute to greater uniformity in the liner thickness. Preferably the thickness, as measured by ASTM standard D1777 is constant across the liner within±1.0 mils. The indentations are also believed to contribute to a significant reduction, by not less than about 40%, in the stiffness of the liner as compared to liners of similar composition not having any indentations. The stiffness of the liner, as measured by ASTM standard D1388-64 (Option A) preferably ranges from about 400 to 1200 mg cm. A typical range for non-embossed liners of similar composition is generally in the range of about 1250 to 2000 mg cm.

The air permeability of liners constructed according to the present invention are significantly lower than similarly constructed, non-embossed liners. This represents an improvement in that it enables liners to be effectively manipulated by vacuum forces during disk assembly. Preferably, the air permeability of liners in the invention is not greater than 450 cubic feet per minute (cfm), as measured by the method of ASTM standard D737-75. Similarly constructed liners not having an embossed pattern have an air porosity in the range of about 400 to 500 cfm. Such a reduction in the air porosity of the liner can be significant as it improves the ability to manufacture disks using an automated assembly, and can significantly reduce the reject rate of liners in an automated assembly.

The indentations formed by the embossing roll can be of a variety of shapes and patterns. The indentations should comprise at least about 15% of the surface area of the liner. More preferably, the indentations comprise between 15 and 20% of the surface area of the liner. Diamond-shaped indentations are among the most preferred, but indentations having other shapes may be used as well. The depth of the indentations is not critical as long as the indentation does not penetrate or rupture the liner.

The invention is further illustrated by the following example.

EXAMPLE

Various non-woven fabric liner materials were prepared according to known manufacturing techniques. Approximately half of the liners were embossed according to the present invention such that the total surface area of the indentations formed by the embossing comprised about 20% of the surface area of the liner. These liners were compared to the non-embossed, but otherwise identical, liners to assess any differences in the properties of thickness variation, air permeability and stiffness. The composition of the various liners is as follows.

| Liner | Composition |
| --- | --- |
| A | 50/50 blend of rayon (1.5 denier) and polyester (1.0 denier) with styrene butadiene rubber binder (85% by weight fiber, 15% by weight binder). |
| B | 50/50 blend of rayon (1.5 denier) and polyester (1.0 denier) with styrene butadiene rubber binder (85% by weight fiber, 15% by weight binder). |
| C | 50/50 blend of rayon (1.5 denier) and polyester (1.0 denier) with styrene butadiene rubber binder (85% by weight fiber, 15% by weight binder). |
| D | 50/50 blend of rayon (1.5 denier) and polyester (1.0 denier) with styrene butadiene rubber binder (85% by weight fiber, 15% by weight binder). |

-continued

| Liner | Composition |
|---|---|
| E | 75/25 blend of polyester (1.0 denier) and rayon (1.5 denier) with styrene butadiene rubber binder (85% by weight fiber, 15% by weight binder) |
| F | 50/50 blend of rayon (1.5 denier) and polyester (1.5 denier) with styrene butadiene rubber binder (85% by weight fiber, 15% by weight binder). |

The results of the comparative tests are shown in Tables 1 through 3.

TABLE 1

Thickness Variation (mils)
(ASTM Standard D1777

| Unembossed | | | Embossed | | |
|---|---|---|---|---|---|
| Liner | Avg. | Std. Dev. | Liner | Avg. | Std. Dev. |
| A | 9.3 | .45 | A | 9.1 | .29 |
| B | 8.9 | .39 | B | 8.8 | .23 |
| C | 8.0 | .48 | C | 7.7 | .20 |
| D | 7.3 | .35 | D | 7.2 | .30 |
| E | 6.5 | .35 | E | 6.4 | .21 |
| F | 7.8 | .35 | F | 7.7 | .25 |

TABLE 2

Air Permeability (cfm)
(ASTM Standard D737-75)

| Unembossed | | Embossed | |
|---|---|---|---|
| Liner | Avg. | Liner | Avg. |
| A | 370 | A | 300 |
| B | 375 | B | 330 |
| C | 390 | C | 370 |
| D | 455 | D | 420 |
| E | 470 | E | 420 |
| F | 495 | F | 455 |

TABLE 3

Flexural Rigidity (stiffness, mg.cm)
(ASTM Standard D1388-64 (Option A))

| Unembossed | | Embossed | |
|---|---|---|---|
| Liner | Avg. | Liner | Avg. |
| A | 2000 | A | 1150 |
| B | 1850 | B | 800 |
| C | 1500 | C | 500 |

It is understood that various modifications may be made in the present invention without departing from the intended scope thereof. Unless otherwise noted, all percentages cited herein are by weight.

What is claimed is:

1. A magnetic disk cartridge, comprising:

a jacket;

a rotatable magnetic disk; and a liner affixed to disk-facing surfaces of the jacket, the liner comprising a nonwoven fabric formed of staple fibers bonded together by a latex material, wherein the latex material is present at about 10 to 35% by weight of the liner, at least one side of the liner having a plurality of spaced, permanent indentations, wherein the indentations are formed into the liner at a temperature below the melting point of any thermoplastic material in the fabric.

2. The magnetic disk cartridge of claim 1 wherein the indentations are present in the liner at sufficient density such that the indentations comprise between about 15 and 25% of the surface area of the liner.

3. The magnetic disk cartridge of claim 1 wherein the liner has an air porosity of between about 400 and 450 cubic feet per minute.

4. The magnetic disk cartridge of claim 3 wherein the liner has a machine direction stiffness of between about 400 and 500 mg cm.

5. The magnetic disk cartridge of claim 3 wherein the thickness of the liner is between about 5 and 12 mils as measured by American Society for Testing Materials (ASTM) standard D1777.

6. The magnetic disk cartridge of claim 5 wherein the maximum thickness of the liner is substantially constant within about ±1.0 mils.

* * * * *